Patented June 16, 1942

2,286,333

UNITED STATES PATENT OFFICE 2,286,333

COATING ALLOY

Clinton Bowsher, Lima, Ohio, assignor to The Artkraft Sign Company, Lima, Ohio, a corporation of Ohio No Drawing. Application June 14, 1941,
Serial No. 398,113

1 Claim. (Cl. 75—166)

This invention relates to the welding and galvanizing arts, and more particularly to the art of re-galvanizing a welded surface.

This is a division of my application Serial No. 388,493 entitled Compounds or alloys for coating welds, filed April 12, 1941, and assigned to the same assignee as the present invention.

There is described in Patent No. 2,224,953, dated December 17, 1940, of which I am one of the joint inventors, an improved method of seam and spot welding galvanized surfaces, in which the surface from which the galvanized layer has been burned off during the welding process is re-coated with a galvanizing material. It is apparent that unless a metal protective layer is immediately applied to the surfaces which are deprived of their original galvanized coating, due to the melting effects of the welding heat, oxidation and corrosion might set in and eventually cause the welded joint to weaken. The coating material is obtained preferably from a cold stick of solder held by hand and rubbed over the welded surface while the latter is still hot from the welding operation. The solder is thus caused to melt solely due to the heat of the weld, and to adhere to those surfaces from which the original galvanized coating has been burned off.

A process of this character has been found to be quite practical, particularly in connection with the manufacture and erection of signboards, marquees and other outdoor structures made of angle iron which has been rendered rust-proof by galvanizing, and in which the structural members are welded together on location. However, the process of re-galvanizing those surfaces from which the original galvanized metal has been removed during the welding operation calls for considerable skill in determining the best way of manipulating the solder stick over the burned surface to lay down a smooth coating of uniform thickness, similar to the original coating. Moreover, when using ordinary low-melting solder which does not contain a flux, the operator must be able to determine from the character of the welding metal and of the structural members as to whether or not a flux is desirable in order to provide the required tenacity of adherence of the re-galvanized coating to the base metal. Flux may also be necessary in certain circumstances to prevent fissures and cracks from forming which might admit a corroding effect through the re-galvanized coating. When a liquid flux is spread over the heated surface the latter is cooled slightly, depending on the might add to the difficulty of laying down a protective coating from a cold stick of solder.

For the re-coating layer it has been customary to employ solder of the type which consists of tin and lead, but the tin which gives the hardness property to the coating is somewhat expensive, and even though the combination of tin and lead takes on a fairly hard surface upon cooling, nevertheless the surface is not as hard as the original galvanized coating which is composed chiefly of zinc.

The primary object of the present invention is to provide an improved low-melting galvanized material which has none of the disadvantages set forth in connection with ordinary solder and yet which can be applied in cold stick form to a welded surface, employing only the residual heat of the weld.

Another object is to provide a low-melting alloy for re-coating purposes which contains a flux in metal form for promoting the coating quality of the alloy, and which flux does not reduce the temperature of the welded parts during the coating operation.

A still further object is to provide a galvanizing alloy which when deposited on an area of limited size of a heated metal surface, will readily flow and distribute itself in all directions as a thin continuous layer from the area of limited size.

A more general object is to provide an improved alloy which may be melted by heat of relatively low temperature obtained in any suitable manner, and in which the alloy has the property of tenaciously adhereing to any of the base metals, such as iron, steel, etc.

It was pointed out in the prior patent that when two metal structural members, which had been previously galvanized in any suitable and well known manner, were welded together by any one of the well known welding processes, such as by arc welding, using a lap, stitch or seam weld, or when employing a resistance weld as in the case of butt joints, the heat of the weld caused the galvanized coating to be burned off for a considerable distance on each side of the weld. The size of the area from which the galvanized coating is removed, under these circumstances, depends not only on the heat of the weld necessary to make a secure joint, but also on the position of the structural members, at the time the weld is being made.

In certain types of framework, for example, such as erected along highways and on top of buildings to carry large signs, many of the welded by means of a portable welder, in which case the structural elements are usually in a vertical position. When the welding electrode is applied to the joint between two of the structural elements rigidly to secure the same, it is apparent that the generated heat is so great, particularly when welding electrodes of a high melting character are employed, as to cause the galvanized coating to melt and to leave the base metal. This metal tends to flow by gravity from the welded joint, and will quickly leave exposed the surface of the base metal. In addition the metal deposited at the joint by the welding electrode is of a character similar to the base metal, so that there is a considerable area of metal immediately surrounding the welded joint which is very susceptible to corrosion and rust.

The fact that these bare spots or surfaces have been subjected to heat greatly accelerates the corrosive effects, and unless precaution is immediately taken the joint will be severely weakened over the course of time. These weakening effects are accentuated in the case of signboard frameworks, marquees and other structures which are constantly exposed to the elements, rapid changes in outdoor temperature and the extreme corrosive effects of snow, sleet, or rain storms in the summertime. Frameworks which carry signs of considerable area are subjected to the force of the wind, driving rain, etc., so that even the slightest weakening at any one of the welded joints may cause the entire structure to fall, possibly with disastrous results.

It has been proposed in the past to protect those surfaces from which the galvanized coating was removed during the welding operation by covering the surfaces with one or more coats of paint or enamel. This is particularly true in the case of ship building, in which galvanized iron plates are welded together to form the hull of the ship. However, it has been found that the paint or enamel layer tends to crack, due to the expansion or contraction of the base metal, leaving fissures through which an oxidizing agent such as the atmosphere or water, may penetrate to the surface of the base metal.

The prior patent referred to hereinbefore discloses a method by which a metal protective layer can be instantly applied in situ to the welded members which have previously been galvanized, and from which the galvanized coating had been burned off. According to the patented process, a cold stick of solder was immediately rubbed over the exposed areas, the solder being caused to melt solely by the residual heat left in the welded areas, whereupon a layer of metal would be laid down at the places over which the solder stick was moved. As the base metal cooled, the metal layer became solid and merged itself with the remaining galvanized coating so as to represent a continuation of the protective layer. The nature of the solder was such, and particularly when applied immediately after the welding operation, as to cause the deposited metal to adhere most tenaciously to the surfaces left bare, and also to the surface of the welding material which had been deposited by the welding electrode. Thus, all of the surfaces of the base metal, including the welding filler, are coated by a thin layer of solder. No other heat than that furnished by the welding operation is necessary, even when the bare spots are of considerable area, because the fact that the original galvanized coating has left these areas, due to the latter having reached a melting temperature, provides sufficient heat throughout the areas to melt the applied solder.

After considerable development work, based on a critical study of the coating as laid down by the solder stick, I have found an alloy which gives superior results as a metal protective layer over those offered by solder. The metal is deposited preferably in cold stick form by hand manipulation, as in the case of the earlier patent, and these sticks may be obtained by an extrusion or molding process. The alloy is preferably made in one-hundred-pound lots, and thereafter cast, extruded or changed to any shape, form or size which may be desirable for manipulation purposes. The exact constituency of the improved alloy will vary, depending upon the residual heat which is available for melting the cold stick, and this in turn, depends on the welding temperatures and therefore on the gauge of the angle iron or other form of structural members which are welded together.

When using angle iron framework elements of light weight, for example when thin metal plates are welded together, the improved alloy may be constituted as follows:

100-pound lots:
    7¼ lbs. of bismuth
    12½ lbs. of block tin
    10 ounces of metallic mercury
    79½ lbs. of soft lead An alloy of this character melts at approximately 550° F.

The procedure of making the alloy or compound is as follows:

1. The lead is first melted in any suitable form of furnace, being added thereto in small chunk form, and stirred preferably by a motor stirrer.

2. When the temperature of the lead has reached approximately 1100° F. the tin component is added while the mixture is stirred continuously.

3. After sufficient stirring to assure that the lead and the tin have been completely incorporated, the mercury component is added.

4. The molten mixture is then allowed to cool to a temperature of approximately 650° F. which is suitable for pouring, at which time the bismuth component is added.

5. Thereafter the molten mass is poured into molds in 100-pound lots or shaped in any other suitable manner, for example, by extrusion.

6. Bars approximately 15" long, ½" wide and ¼" thick may be obtained from the 100-pound mass, the above length and size of these bars having been found to be most convenient when rubbing the alloy over a heated surface.

The resulting bar or rod may be applied to the bare spots immediately surrounding the welded joint either directly after the welding operation, while the weld is still hot, or the welding surfaces may be re-heated in any suitable manner by means of an acetylene flame, to melt the end of the bar. In case it is desired to apply the galvanize coating after the metal parts have been reheated, the latter are first allowed to cool preferably to room temperature, but in any case to less than 150° F. at which time, it will be observed that the slag caused by the welding electrode begins to become loosened from the welded surface. The slag layer is conveniently removed by any suitable form of tool such as a wire brush or vibrator.

An analysis of the formula given above will show that the tin acts as a coating or galvanizing agent, the bismuth and mercury acting as metal fluxes, while the soft lead serves as a carrying agent for distributing the other metals evenly and quickly over the bare spots as the cold metal stick is manipulated. The tin produces a protective coating which is as hard as the galvanized layer provided on the base metal surface prior to the welding operation. The presence of bismuth and mercury promotes the tenacity with which the tin adheres to the base metal, serving as a flux in this respect and to some extent causing the metal of the layer to penetrate the surface of the base metal and to embed itself in the latter. The metal layer clings to the base metal with such tenacity as positively to preclude any peeling or other form of separation between the metal and the coating.

When properly applied it is impossible to separate the coating from the base metal except by cutting through the coating metal itself. The coating becomes practically integral with the base metal, even more so than in the case of the original galvanized coating because when the improved coating is applied, the high heat of the welded joint causes the coating actually to penetrate the base metal, whereas in the hot dip galvanizing the coating is merely surface bonded to the foundation metal due to the fact that the metal to be galvanized is put into the bath cold and only absorbs heat from the bath itself. The soft lead component of the alloy which forms the greatest proportion of the compound serves to conduct the other elements quickly to all parts of the bare spot so that not the slightest fissure or crack can form, and the spreading of the metal layer as a thin continuous surface is greatly facilitated.

While I have described my invention as constituting an alloy which can be advantageously used in cold stick form for re-coating areas at a welded joint from which the original galvanized coating has been removed, it will be understood that the alloy is not limited to this use. The alloy may be employed as an original galvanized coating, using the hot dip method, or may be employed for applying an original galvanized coating on a base metal which has been heated in any suitable manner, and using the alloy in cold stick form. In all of these cases the alloy will distribute itself quickly and evenly over the base metal without the slightest fissure or crack, and will stick so tenaciously to the metal as to constitute practically an integral part thereof.

The alloy, when cast in plate form, may be used as the anode of a plating bath for electrolytically applying a protective coating to a foundation metal.

Another use for the improved alloy is in connection with a metal gun for coating and spraying purposes, in which case the alloy would be extruded in wire form for introduction into the gun.

It will be understood that I desire to comprehend within my invention such modifications as come within the scope of the claim and the invention.

Having thus fully described my invention, what I claim as new and desire to secure by Letters Patent, is:

A compound for coating purposes comprising by weight approximately 7¼ parts bismuth, approximately 12½ parts tin, approximately ¾ part mercury, and approximately 79½ parts lead.

CLINTON BOWSHER.